(12) United States Patent
Ruona

(10) Patent No.: US 7,987,662 B2
(45) Date of Patent: Aug. 2, 2011

(54) COMPOSITION AND METHOD FOR CONTROLLING EXCESSIVE EXHAUST GAS TEMPERATURES

(75) Inventor: William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 875 days.

(21) Appl. No.: 11/930,849

(22) Filed: Oct. 31, 2007

(65) Prior Publication Data

US 2009/0107118 A1   Apr. 30, 2009

(51) Int. Cl.
*F01N 3/00* (2006.01)

(52) U.S. Cl. .............. 60/286; 60/274; 60/295; 60/297; 60/301; 60/303; 60/311

(58) Field of Classification Search .............. 60/274, 60/286, 295, 297, 301, 303, 311
See application file for complete search history.

(56) References Cited

U.S. PATENT DOCUMENTS

| | | | |
|---|---|---|---|
| 5,628,186 A | 5/1997 | Schmelz | |
| 6,295,809 B1 | 10/2001 | Hammerle et al. | |
| 6,314,722 B1 | 11/2001 | Matros et al. | |
| 7,047,729 B2 * | 5/2006 | van Nieuwstadt et al. | 60/286 |
| 7,063,642 B1 | 6/2006 | Hu et al. | |
| 7,173,246 B2 | 2/2007 | Benedetti et al. | |
| 7,322,182 B2 * | 1/2008 | Ueno et al. | 60/295 |
| 7,343,735 B2 * | 3/2008 | Wang et al. | 60/286 |
| 7,533,524 B2 * | 5/2009 | Wang et al. | 60/297 |
| 2007/0006573 A1 | 1/2007 | Hu et al. | |
| 2007/0245714 A1 * | 10/2007 | Frazier et al. | 60/276 |

FOREIGN PATENT DOCUMENTS

| | | |
|---|---|---|
| EP | 1106799 | 6/2001 |
| EP | 1431529 | 6/2004 |
| EP | 1630369 | * 3/2006 |
| JP | 2003/293736 | 10/2003 |

OTHER PUBLICATIONS

ISA United Kingdom Intellectual Property Office, Search Report of GB0819745.I, Feb. 26, 2009.

* cited by examiner

*Primary Examiner* — Thomas E Denion
*Assistant Examiner* — Diem Tran
(74) *Attorney, Agent, or Firm* — Julia Voutyras; Alleman Hall McCoy Russell & Tuttle LLP

(57) ABSTRACT

A method of operating an internal combustion engine having a reductant delivery and storage system in an emission control system is disclosed. The method includes an approach for reducing thermal damage to aftertreatment devices in an exhaust system by reducing excessive exhaust gas temperatures created during particulate filter regeneration.

13 Claims, 8 Drawing Sheets

COMPOSITION AND METHOD FOR CONTROLLING EXCESSIVE EXHAUST GAS TEMPERATURES

TECHNICAL FIELD

The present application relates to the field of automotive emission control systems, particularly to regulation of temperature in emission control systems.

BACKGROUND AND SUMMARY

Various approaches may be used for reducing soot in engine exhausts, including soot filters. One type of soot filter is a diesel particulate filter (DPF). A DPF is a device designed to remove diesel particulate matter from the exhaust gas of a diesel engine. However, collection of particulate matter on the DPF increases back pressure in the exhaust system, decreasing fuel economy. Therefore, the filter may be periodically cleaned or regenerated so that it may continue to be used. Regeneration burns off the accumulated particulate matter either passively, in DPFs that are constructed with a catalyst, or actively, by increasing exhaust temperature to further combust the soot. Exhaust temperature may be increased through engine management, a fuel burner, a catalytic oxidizer, resistive heating coils, or microwave energy, to name a few.

Increases in exhaust temperature, such as during DPF regeneration, may result in self-sustained and self-induced temperature increase, thus increasing the temperature of the emissions control system past acceptable levels and thereby degrading aftertreatment catalysts including diesel particulate filters, lean $NO_x$ traps, in-situ Lean $NO_x$ Trap and SCR catalysts, decreasing the lifespan and effectiveness of such filters and catalysts. In particular, once DPF regeneration is commenced, the heat of that regeneration can further ignite additional regeneration, thereby leading to self-sustained and rapidly increasing regeneration rates and significantly increased temperatures.

Various approaches may be used to limit DPF temperature, and there inventors herein have recognized issues therewith. For example, exhaust air flow may carry heat away from the exhaust system, but may not provide sufficient cooling to reduce self-sustained and self-induced temperature increases. Additionally, it may not be clear in advance of self-sustained and self-induced temperature increases if certain operating conditions will allow enough air flow to cool the DPF. Another way to control temperature is to limit excess oxygen in the exhaust system, thereby decreasing combustion and the temperature in the system. However, decreasing combustion may stall or stop regeneration prematurely, thereby decreasing the effectiveness of the regeneration, defeating the purpose of the filter and increasing fuel consumption inefficiencies. Further, the reduction of oxygen necessary to limit temperature may lead to excessive smoking in the engine.

The inventors herein have also realized that these concerns and others may be addressed by a system for an engine exhaust. The system may comprises an exhaust conduit to conduct engine exhaust; a particulate filter disposed along the exhaust conduit; a reductant storage device coupled to the exhaust conduit and configured to store urea; and a controller comprising memory and a processor, the memory comprising instructions executable by the processor to supply the urea to the exhaust system upstream of the particulate filter when exhaust gas temperature exceeds a threshold value during particulate filter regeneration. In this way, urea stored on board for NOx reduction in an SCR, for example, can also be used for managing filter regeneration. Note also that urea injection may be used to manage other self-sustained and self-induced temperature increase conditions, such as sulfur regeneration, etc.

DETAILED DESCRIPTION OF THE DEPICTED EMBODIMENTS

Figure 1:
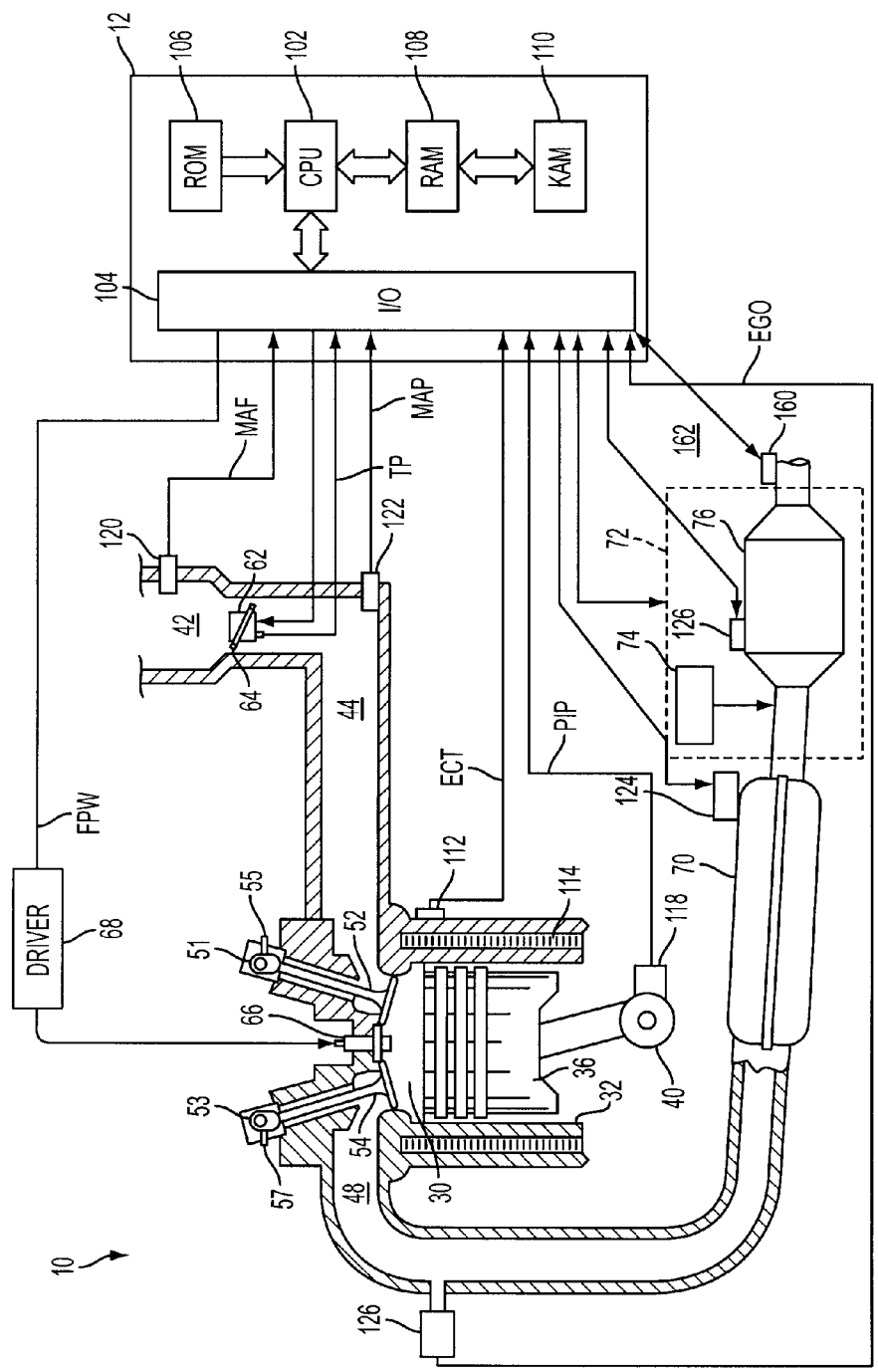
FIG. 1 shows an exemplary embodiment of an internal combustion engine and control system.

Referring to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, hydrocarbon (HC), or carbon monoxide (CO) sensor and may provide continuous oxygen readings.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and one or more emission control device(s) 76. Emission control device 76 is shown in communication with catalytic converter 70. Reductant storage device 74 may supply a reductant to an exhaust stream entering emission control device 76. Emission control system 72 is described in more detail in FIG. 2.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); catalytic converter temperature $T_{cat}$ from temperature sensor 124; emissions control device temperature $T_{ec}$ from temperature sensor 126; throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. Controller 12 is configured to control emission control system 72. Further, emission control system 72 may send feedback to controller 12. This feature is described in more detail below.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, $H_2$, ethanol, methane, and/or combinations thereof may be used.

Figure 2A:
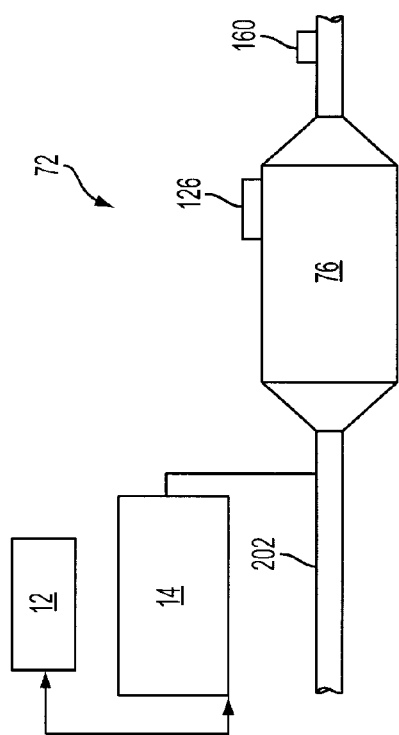
FIGS. 2 A and B show exemplary embodiments of an emission control system.
Figure 2B:
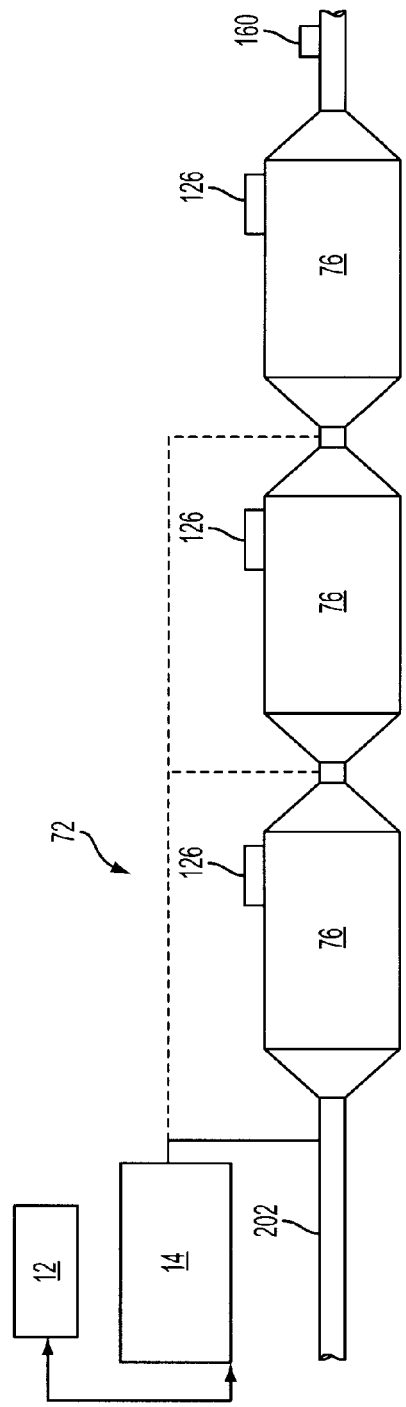

FIGS. 2A and 2B show examples of emissions control system 72 of engine 10 in more detail. Emissions control system 72 may contain one or more emissions control device(s) 76. An emissions control device may be any catalyst or soot filter commonly used in such systems. For example, emissions control devices may be a diesel particulate filter (DPF), a selective catalytic reduction system (SCR), a lean $NO_x$ trap, (LNT), an in-situ Lean $NO_x$ Trap, a $NO_x$ catalyst, or any other aftertreatment catalyst generally known to those of skill in the art. In some embodiments, emissions control system 72 may contain a series of catalysts or soot filters as shown in FIG. 2B. Such catalysts and/or soot filters may be in any order that achieves the desired filtration. In some embodiments, emissions control device 76 may be a DPF. In other embodiments, emissions control system 72 may contain an SCR and a DPF. In further embodiments, emissions control system 72 may contain an SCR, a DPF and a $NO_x$ catalyst.

Generally, the components described herein may operate to reduce self-sustained and self-induced temperature increases during particular engine operating conditions such as DPF regeneration, LNT desulfation ($DeSO_x$), SCR hydrocarbon purges, hydrocarbon scrub and denitration. In some embodiments, self-sustained and self-induced temperature increases may be reduced by monitoring exhaust gas temperatures and/or by monitoring the temperatures of emissions control devices and initiating a protection strategy when the temperature approaches a threshold value. In other embodiments, self-sustained and self-induced temperature increases may be reduced by initiating a protective strategy when particular engine conditions are detected. For example, a protective strategy may be initiated during regeneration, LNT $DeSO_x$, or SCR hydrocarbon purges or under particular types of regeneration, LNT $DeSO_x$, or SCR hydrocarbon purges. In yet another embodiment, self-sustained and self-induced temperature increases may be reduced by comparing temperatures upstream and downstream of an emissions control device and when the temperatures exceed predetermined values or a predetermined differential, initiating a protection strategy.

In some embodiments, a protective strategy would be to supply a reductant to exhaust system 202 as shown in FIG. 2A or B in order to reduce the temperature of the exhaust gases. In another embodiment, a protective strategy would limit $O_2$ in the exhaust. In further embodiments, reductant may be supplied and $O_2$ may be limited.

In particular, emission control system 72 may inject reductant from storage device 74. In some embodiments, reductant storage device 74 may be an on-board storage device for storing a reductant used in emission control system 72. In other embodiments, the reductant storage device may store an aqueous urea solution supplied by a vehicle operator, although various other reductants may be used. Under some conditions, the reductant storage device may hold a combination of water and urea in a plurality of phases. For example, an amount of urea may solidify while a corresponding amount of water may not solidify. As such, the composition of the liquid urea solution may be altered such that the composition of the liquid released may be adjusted to facilitate temperature control. Accordingly, it may be desirable to include a concentration sensor whereby the amount of liquid released may be adjusted based on a concentration of urea. Alternately or in addition, reductant storage device 74 may include a temperature sensor such that feedback from the temperature sensor may be used to determine a concentration of urea in the urea solution.

In some embodiments, a eutectic solution including urea and water may be supplied to reductant storage device 74 such that the composition of urea and water in a plurality of phases may not vary substantially. It may be appreciated that a eutectic mixture may be a mixture of two or more phases at a composition that has the lowest melting point, and where the phases simultaneously crystallize from liquid solution at this temperature. By using a eutectic aqueous urea solution, the composition of two or more phases of the solution may include substantially the same make-up of water and urea. For example, frozen water and crystallized urea from a eutectic aqueous urea solution may be present in a substantially equivalent ratio in the liquid aqueous urea solution.

The amount of reductant released may be determined by controller 12 which is configured to control the selective supply of the stored reductant to the exhaust system. The injection of the reductant from the reductant storage device may be placed prior to or between any one or more soot filters or catalysts in emission control system 72. For example, the reductant storage device may inject reductant prior to emission control device 76, such as prior to a DPF or between multiple emission control devices such as between an SCR and DPF, or prior to a series of emission control devices or in any other combination that achieves the desired results. In some embodiments, it may be desirable to have different temperature thresholds at different points in the exhaust system. For example, in order to reduce self-sustained and self-induced temperature increases during DPF regeneration, it is desirous to keep the temperature below about 800° C. However, LNTs operate most efficiently between about 300 and 350° C. It may therefore be desirous to inject sufficient reductant before a DPF to lower the temperature of the DPF to between about 800° C. and about 600° C. and before the LNT to lower the temperature of a downstream LNT to between 350° C. and 300° C.

The controller 12 releases the reductant when temperature levels of the exhaust system gases or emissions control devices exceed a threshold level. In some embodiments, temperature of emissions control system 72 may be inferred from engine operation. Such engine operations may include DPF regeneration, LNT DeSO$_x$, or SCR hydrocarbon purges.

In other embodiments, temperature such as the temperature of the catalyst converter, $T_{cat}$, may be provided by temperature sensor 124. In additional embodiments, the temperature of emissions control devices, temperature $T_{ec}$, may be provided by one or more temperature sensor 126. In some embodiments, there may be a temperature sensor connected to each catalyst or soot filter. In other embodiments, there may be only a single sensor. Such a sensor may be placed on any catalyst or filter in the emissions control system. For example, if emissions control system 72 consists of an SCR, a DPF and a NO$_x$ catalyst, there may be sensors on one, some or all of the components. In other embodiments, there may be sensors placed before or after each catalyst or filter, or before or after some of the catalysts or filters. Each sensor provides a measurement indication to controller 12 as described herein. Information from each sensor may be used alone or in combination with one or more additional sensors.

In some embodiments, trigger/threshold temperatures inducing release of reductant may be those approaching or exceeding about 800° C. Sufficient reductant may be released to cool the exhaust gases to below about 800° C., preferably to below about 600° C. In other embodiments, the temperature of the exhaust gases is lowered to be between about 300° C. and 600° C., preferably to between about 300° C. and 400° C. In another embodiment, a combination of DPF inlet temperature and the time rate of change of the outlet temperature may be used. For example if the DPF inlet temperature is greater than 600° C. and the rate of increase of DPF outlet temperature is increasing faster that 6° C./second, reductant may be injected until the temperature rate of change slows to less than 3° C./second.

In still other embodiments, the trigger may be determined by the difference in temperatures at various sensors. For example, the trigger may be determined by a difference between the engine exhaust temperature upstream of the emissions control device and a desired particulate filter or other emissions control device temperature. In yet another embodiment, the trigger may be determined by the difference in temperature upstream of an emission control device and downstream of an emission control device.

Accordingly, when particular engine operations are detected and/or particular temperatures recorded, the controller may prompt emission control system 72 to release an amount of reductant from the reductant storage device 74 so as to substantially decrease the temperature of exhaust gasses. The amount may be adjusted based on various operating conditions, such as engine speed and load, exhaust temperature, exhaust excess oxygen amount, reductant storage levels, particulate filter loading, etc. For example, if temperature exceeds a threshold and a large soot load remains on the filter, a larger amount of urea may be injected compared with a similar situation with a small soot load remaining on the filter.

In other embodiments, for example, if reductant is unavailable, the protective strategy may involve decreases in oxygen in the exhaust gases, thereby further limiting the exothermic reaction rate. In some embodiments, reductant release may be coupled with decreases in oxygen entering the particulate filter. Sensor 160 provides an indication of oxygen concentration in the exhaust gas. Signal 162 provides controller 12 a voltage indicative of the O$_2$ concentration.

Figure 3:
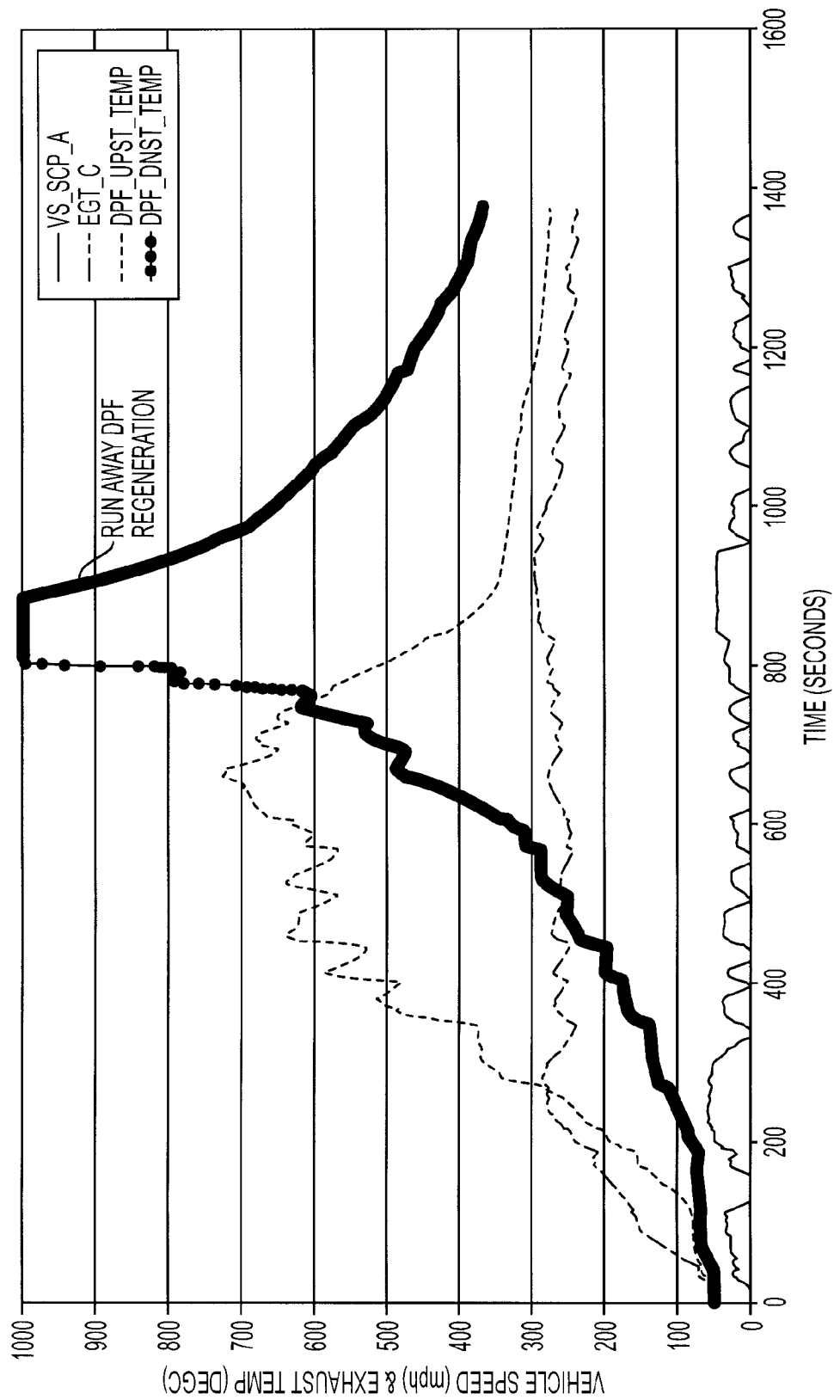
FIG. 3 is a chart depicting DPF regeneration conditions.

Referring now to FIG. 3, a chart depicting self-sustained and self-induced temperature increases (such as thermal runaway) during DPF regeneration is shown. As used in FIG. 3, runaway DPF conditions are denoted as exhaust gas temperature greater than 800° C. downstream of DPF. At temperatures greater than 800° C. the DPF washcoat and material as well as other aftertreatment catalysts are subject to damage such as precious metal sintering and substrate cracking or melting. For example, some SCR catalysts such as vanadium catalysts are deactivated at temperatures above 600° C.

Figure 4:
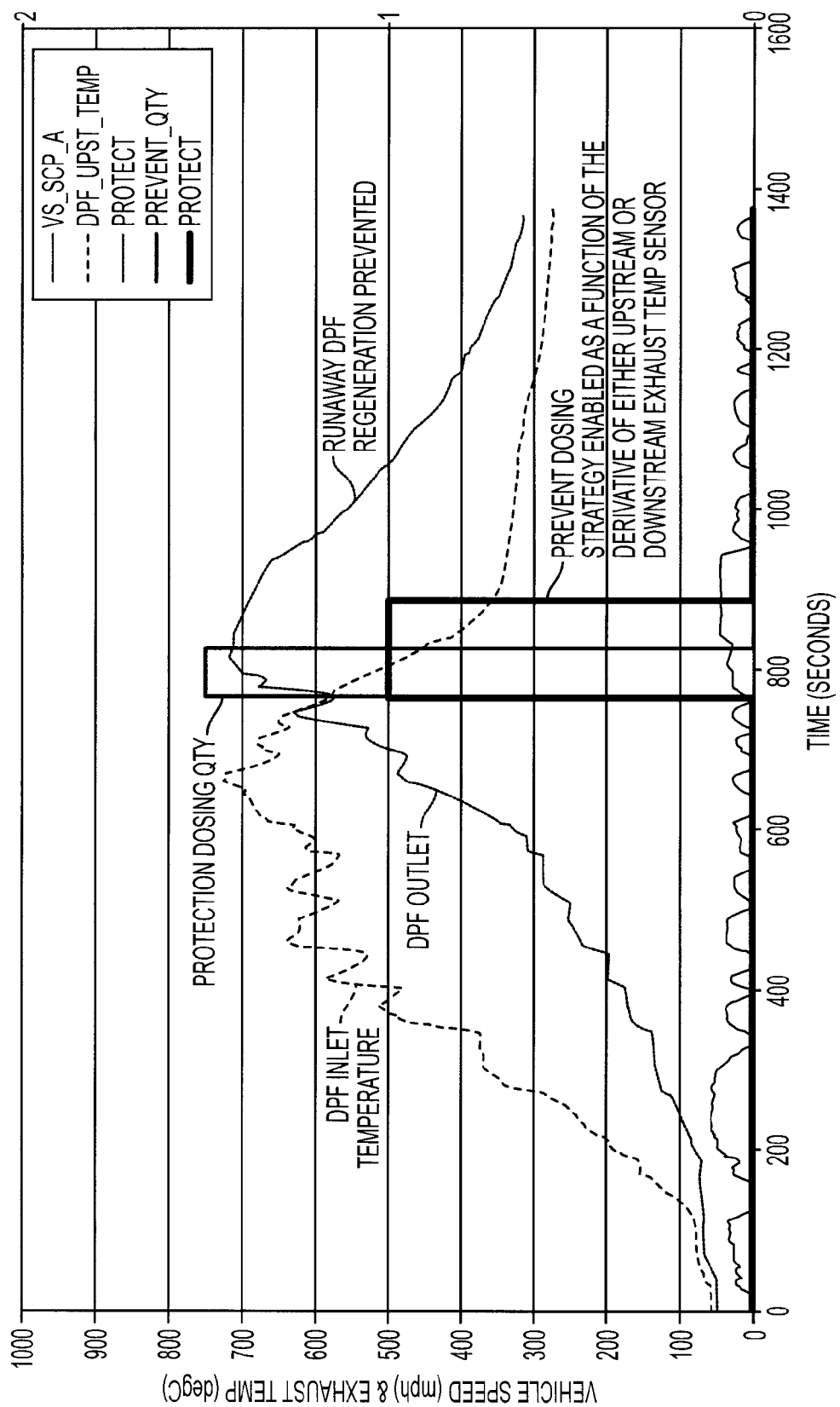
FIG. 4 is a chart depicting reduction of DPF regeneration heat generation.
Figure 5:
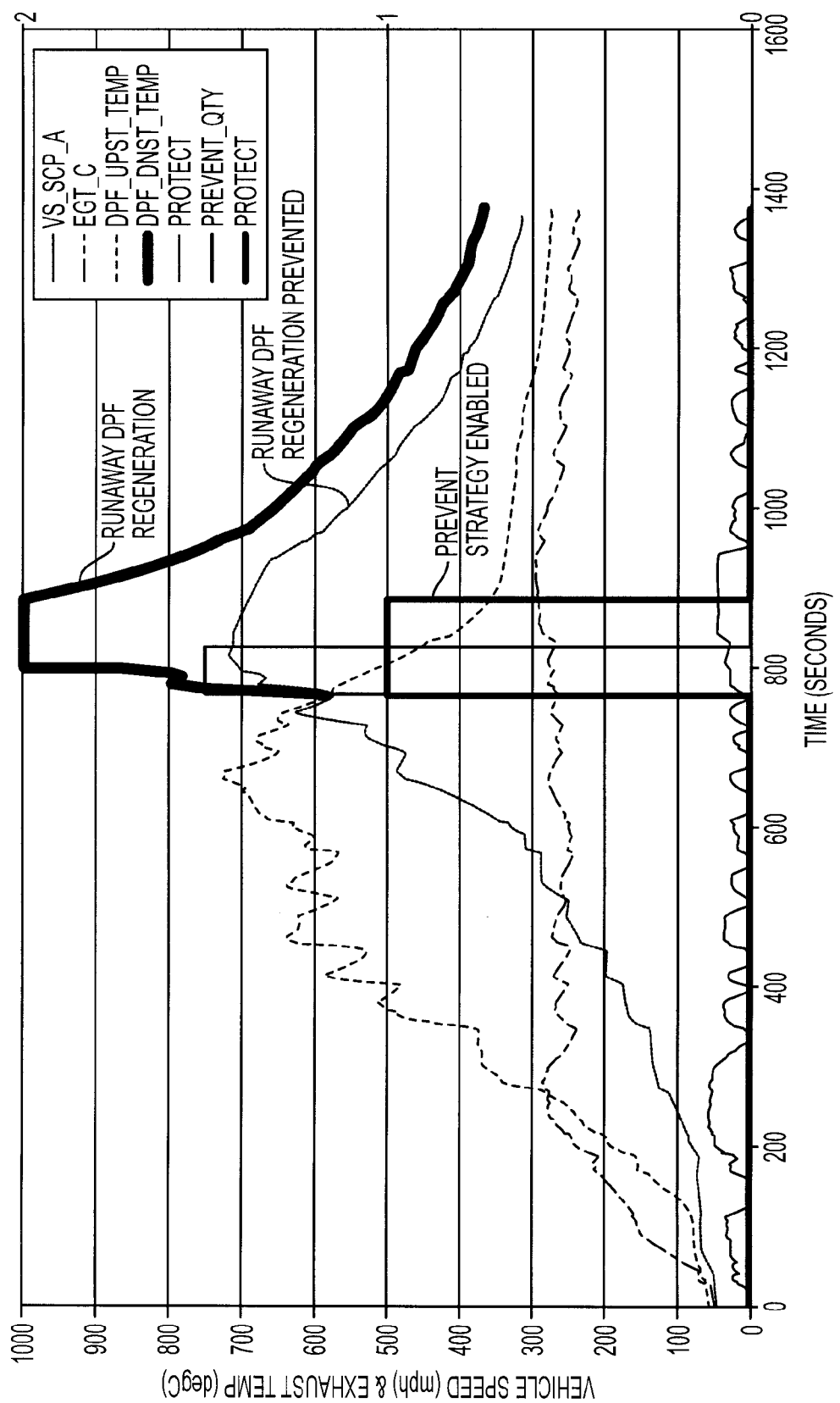
FIG. 5 is a chart comparing exhaust gas temperatures with and without reduction of DPF heat generation.

FIG. 4 depicts the reduction of a potential runway DPF regeneration using a protective strategy as described herein. Exhaust gas temperatures may be measured, for example, using sensors 124 and/or 126. A protective strategy may be initiated as a function of either the upstream or downstream sensor, or both. When a trigger/threshold temperature was detected, the controller 12 released urea from the reductant storage device 74. Sufficient urea was released to reduce the exhaust gas temperatures to a safe/controllable level. A comparison of the temperatures of the exhaust gas during self-sustained and self-induced temperature increases in regeneration and during regeneration in which heat generation has been reduced is depicted in FIG. 5.

Figure 6:
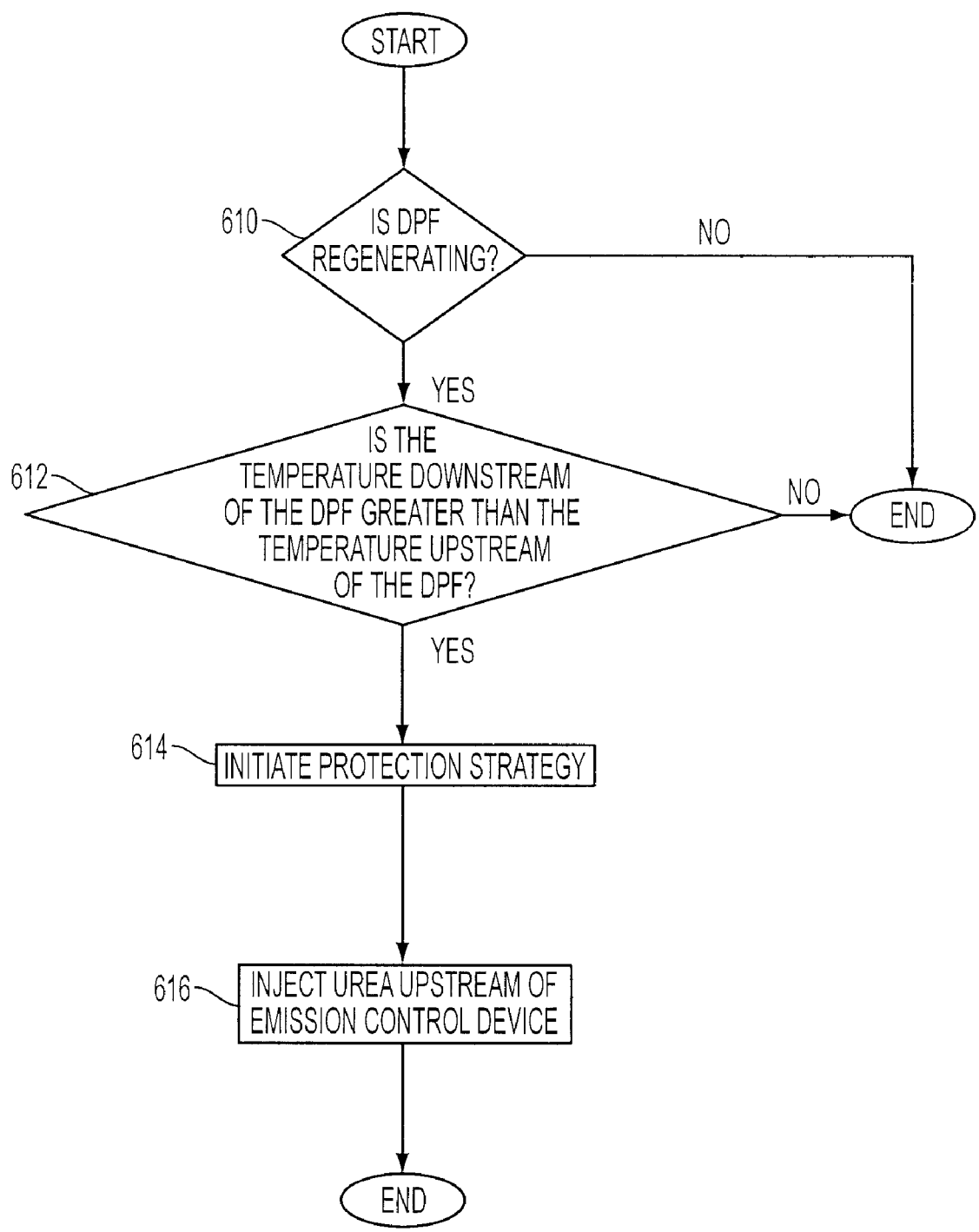
FIG. 6 is a flowchart of an exemplary method of reducing exhaust gas temperatures during DPF regeneration.

FIG. 6 illustrates a flow chart of an exemplary method for operating an emission control system. First, in 610, a determination is made as to whether the diesel particulate filter is regenerating. This determination can be made in various ways, such as, for example, based on a flag set in a control routine, checking whether the particulate filter has stored particles above a predetermined level, after a predetermined length of time, or by any another means known to one of skill in the art. In some embodiments, 610 may be eliminated and the routine may proceed directly to 612. Generally, if the answer to 610 is yes, or 610 is eliminated, the routine determines if the difference in the temperature measured upstream of the DPF filter or other emission control device of interest and the temperature measured downstream of the DPF filter or other emission control device of interest exceeds the predetermined parameters. For example, in some embodiments, predetermined parameters may require that the temperature measured downstream of the DPF filter be below the temperature measured upstream of the DPF filter. In other embodiments, the downstream temperature may not exceed the upstream temperature by more than a particular threshold, for example by no more than about 100° C. In further embodiments, the predetermined values may be based on threshold values and differentials upstream and downstream of another catalyst, filter, trap in the exhaust system or of the exhaust gases. The exact temperature values and differences between the temperature values used may vary depending on various parameters, such as filter materials, catalyst materials, age, size, and various other conditions. When the answer to 612 is yes, the routine continues to 614 and initiates a protection strategy. With the initiation of the protection strategy, the routine proceeds to 616 and injects sufficient urea to lower the temperature upstream of the emission control device as shown in further detail in FIGS. 2A and 2B. Urea may be injected upstream of a single emission control device, such as prior to a DPF, between multiple emission control devices, or upstream of multiple emission control devices. If the answer to 612 is no, then the routine determines that a protective strategy is not necessary and takes no further action.

As exemplified in FIG. 6, by monitoring changes in the upstream and downstream temperatures relative to each other, it is possible to receive an indication of thermal runaway or potential thermal runaway allowing a protective strategy to be initiated to lower the temperature of the exhaust gases and reduce and/or minimize damage to aftertreatment catalysts and filter.

Figure 7:
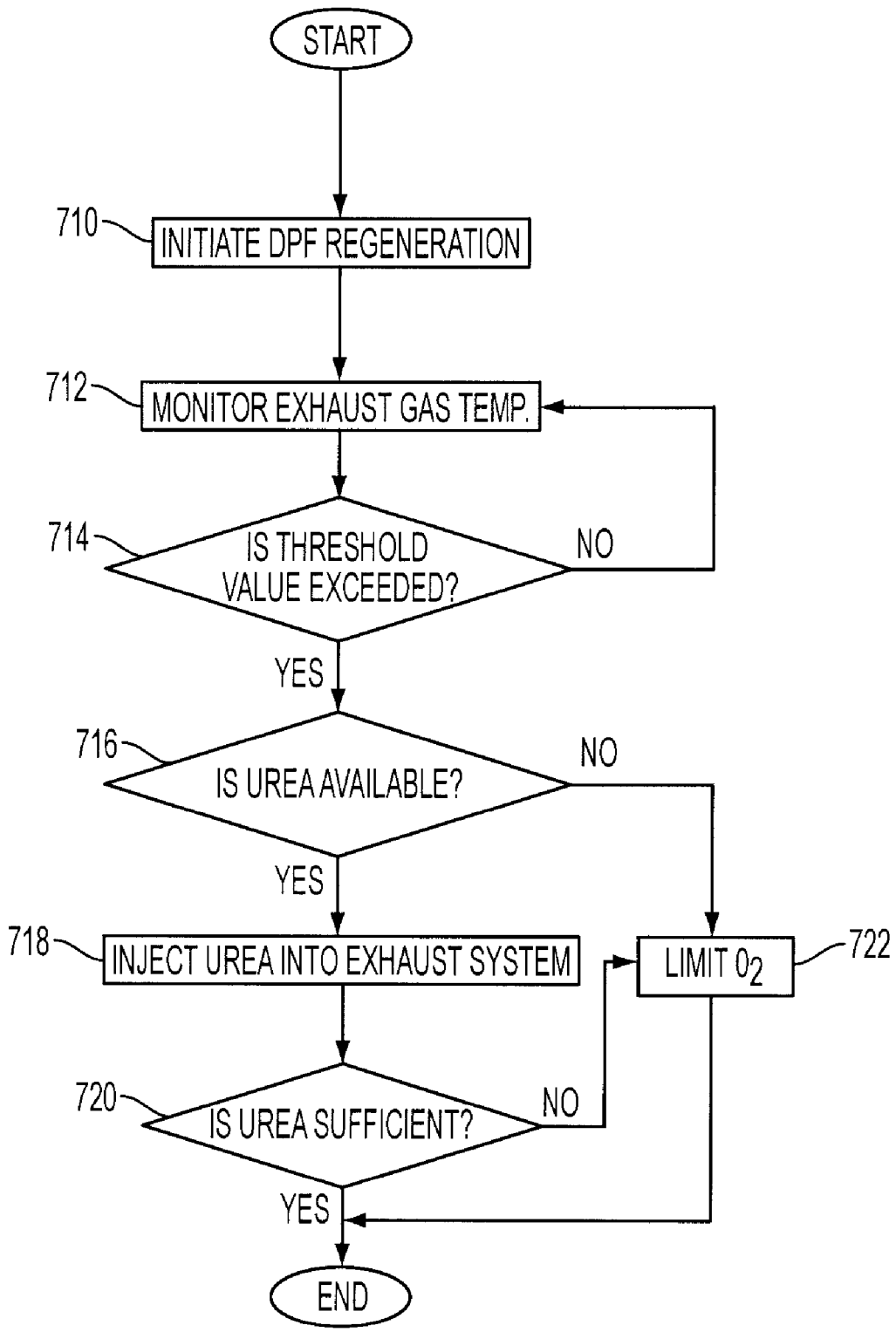
FIG. 7 is a flowchart of an exemplary method of reducing exhaust gas temperatures.

An alternate embodiment is shown in FIG. 7. In FIG. 7, when DPF regeneration is initiated in 710, and the temperature of the exhaust gases and the catalysts are monitored in 712, a determination is made in 714 as to whether the threshold value has been exceeded. If it has not been exceeded, the monitoring continues. If it has been exceeded, a determination is made in 716 as to the availability of urea to inject into the system. If urea is not available, an alternate strategy is activated in 722. For example, the $O_2$ levels in the exhaust may be modified. The $O_2$ level may be modified by using the EGR valve, the intake throttle, a hydrocarbon injector, changing the intake or exhaust valve timing, or by any other means known to those of skill in the art. If the answer to 716 is that urea or another reductant is available, it may be injected into exhaust system 202. A determination may then be made at 720 as to the sufficiency of the urea injection. If the injection is sufficient and the temperature decreases to acceptable levels, the routine will end. If it is not sufficient or reductant is not available, the routine will proceed to 722 and an alternate method may be employed to decrease the temperature below the threshold value such as by decreasing the amount of $O_2$ in the exhaust.

Self-sustained and self-induced temperature increases may be most likely to occur during certain engine operating conditions such as DPF regeneration, LNT DeSo$_x$, SCR hydrocarbon purges, hydrocarbon scrub and denitration. By monitoring exhaust gas temperatures during these operating conditions, it is possible to intervene prior to or just after self-sustained and self-induced temperature increases begin, thereby reducing and/or minimizing degradation to aftertreatment catalysts and filters. As exemplified in FIG. 7, in some instances, it may be necessary to employ more than one strategy to decrease exhaust gas temperatures to acceptable levels. Exhaust gas temperatures may be reduced by the injection of urea or other reductant. However, if there is not enough urea available to decrease the exhaust gas temperatures to below acceptable levels, additional strategies may be employed such as limiting oxygen in the exhaust by using the EGR valve, the intake throttle, a hydrocarbon injector, changing the intake or exhaust valve timing, or by any other means known to those of skill in the art.

Figure 8:
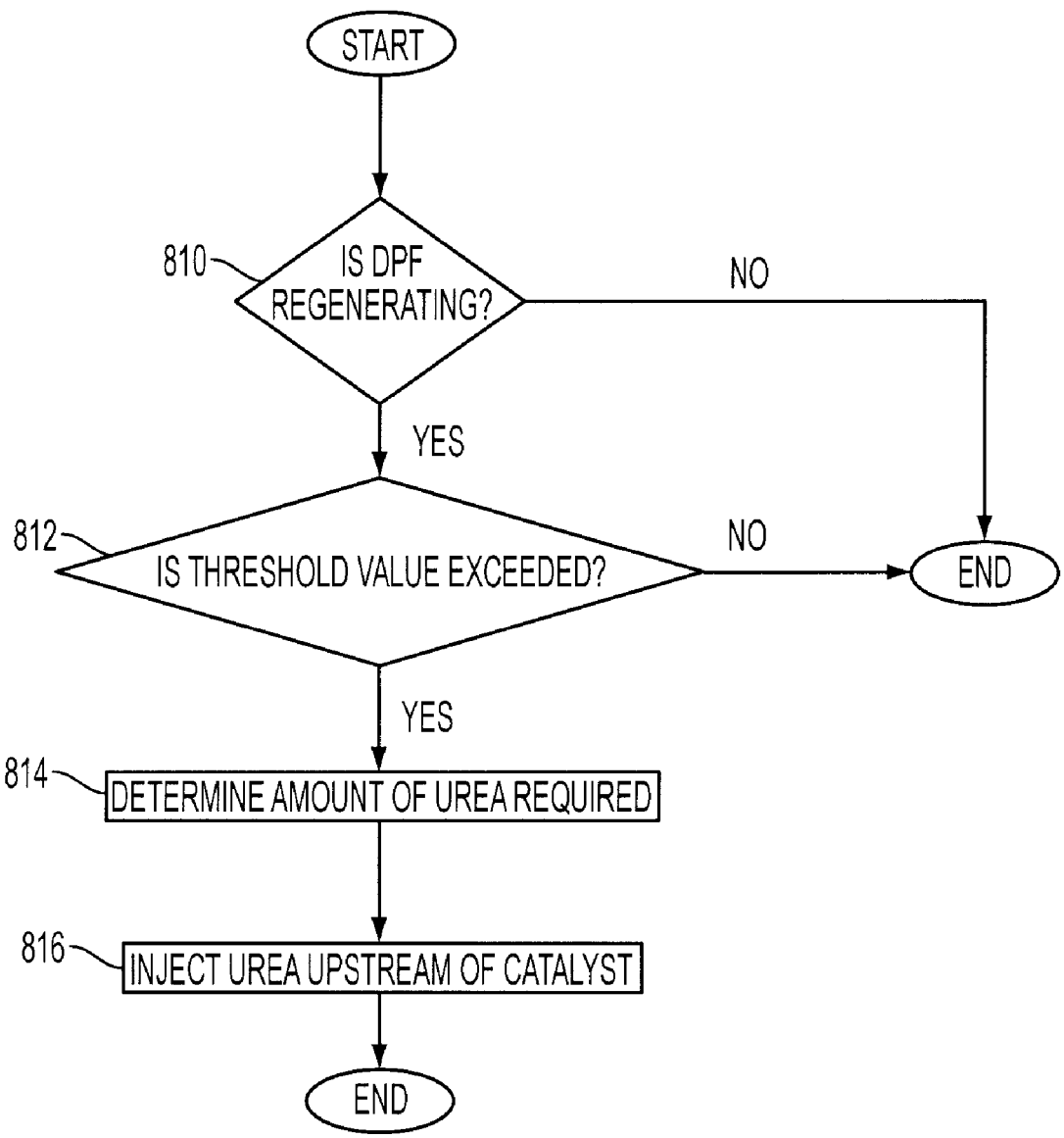
FIG. 8 is a flowchart of an exemplary method of reducing exhaust gas temperatures.

Yet another embodiment is shown in FIG. 8. In FIG. 8, a determination is made at 810, as to whether the particulate filter is regenerating. This determination can be made in various ways, such as, for example, based on a flag set in a control routine, checking whether the particulate filter has stored particles above a predetermined level, after a predetermined length of time, or by any another means known to one of skill in the art. When the answer to 810 is yes, the routine determines if the threshold value of the DPF exceeds the predetermined parameters. For example, if the temperature of the DPF is greater than approximately 600° C. In other embodiments, the threshold value of another catalyst, filter or of the exhaust gases may be used at this point. The exact temperature value used may vary depending on various parameters, such as particulate filter materials, size, and various other conditions. When the answer to 812 is yes, the routine continues to 814 and determines the appropriate amount of urea required to adjust the temperature measured by a sensor to below threshold values. Once the appropriate amount is determined, the urea is injected upstream of the catalyst at 816.

Self-sustained and self-induced temperature increases are most likely to occur during certain engine operating conditions such as DPF regeneration, LNT DeSo$_x$, SCR hydrocarbon purges, hydrocarbon scrub and denitration. As exemplified by FIG. 8, by monitoring information from the exhaust system during these operating conditions or similar operating conditions, it can be determined whether threshold values for the exhaust gas temperature or the temperature of a particular catalyst or filter has been exceeded. Based on the amount by which the threshold value has been exceeded and/or the specific temperature, a determination can be made as to how much urea or other reductant is required to lower the temperature to an acceptable value. By monitoring threshold values, it is possible to reduce or interrupt self-sustained and self-induced temperature increases, thereby reducing and/or minimizing degradation to aftertreatment catalysts and filters.

In alternate embodiments, the determination or initiation of DPF regeneration as shown in FIGS. 6, 7 and 8 may depict other events that increase exhaust gas temperatures, for example LNT DeSO$_x$, SCR hydrocarbon purges, hydrocarbon scrub and denitration.

It may be appreciated that the order of processing to be detailed is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted.

Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling temperature in a motor-vehicle exhaust system, the exhaust system having an SCR catalyst, stored aqueous reductant, and a regenerable soot filter for treating engine exhaust, comprising:
supplying aqueous reductant to the exhaust upstream of the soot filter, including increasing a supplied aqueous reductant amount as a soot amount in the soot filter increases, in response to exhaust-system overtemperature during a first condition; and
lowering an oxygen content of the exhaust in response to exhaust-system overtemperature during a second condition without supplying aqueous reductant.

2. The method of claim 1 further comprising regenerating the soot filter during the first condition and during the second condition.

3. The method of claim 1, wherein the exhaust-system overtemperture comprises an exhaust-system temperature exceeding a threshold value.

4. The method of claim 1, wherein the exhaust-system overtemperature comprises an exhaust-system temperature exceeding a threshold rate of change.

5. The method of claim 1, wherein the exhaust-system overtemperature comprises a temperature downstream of the soot filter exceeding a temperature upstream of the soot filter by a threshold amount.

6. The method of claim 1, wherein the aqueous reductant comprises urea solution.

7. The method of claim 1, wherein lowering the oxygen content of the exhaust comprises throttling an intake airflow to an engine coupled to the exhaust system.

8. The method of claim 1, wherein lowering the oxygen content of the exhaust comprises increasing exhaust-gas recirculation to an engine coupled to the exhaust system.

9. The method of claim 1, wherein an amount of the stored aqueous reductant is above a threshold amount during the first condition and below the threshold amount during the second condition.

10. The method of claim 1, wherein the oxygen content of the exhaust is not lowered during the first condition.

11. The method of claim 1, wherein supplying the aqueous reductant to the exhaust upstream of the soot filter comprises decreasing the supplied aqueous reductant amount as an amount of the stored aqueous reductant decreases.

12. The method of claim 1, wherein supplying the aqueous reductant to the exhaust upstream of the soot filter comprises adjusting an amount of aqueous reductant based on a concentration of the aqueous reductant.

13. The method of claim 1, wherein the exhaust system is a diesel-engine exhaust system and the soot filter is a DPF.

* * * * *